United States Patent
Shima

(10) Patent No.: US 6,697,146 B2
(45) Date of Patent: Feb. 24, 2004

(54) RANGE FINDER FOR FINDING RANGE BY IMAGE REALIZATION

(75) Inventor: Nobukazu Shima, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/177,633

(22) Filed: Jun. 18, 2002

(65) Prior Publication Data

US 2002/0196423 A1 Dec. 26, 2002

(30) Foreign Application Priority Data

Jun. 20, 2001 (JP) ........................ 2001-186779

(51) Int. Cl.$^7$ .................. G01C 3/00; G02B 27/14; B60T 7/16; G03B 13/00
(52) U.S. Cl. .................. 356/3.14; 250/201.6; 180/167; 396/128
(58) Field of Search .................. 180/167; 250/559.31, 250/201.6; 396/128; 356/3.14–3.16; 342/145

(56) References Cited

U.S. PATENT DOCUMENTS 5,255,064 A * 10/1993 Maekawa
5,303,019 A * 4/1994 Irie
5,940,634 A * 8/1999 Nakamura
6,047,136 A * 4/2000 Nakamura .................. 396/128
6,370,262 B1 * 4/2002 Kawabata

OTHER PUBLICATIONS

Patent Abstract of Japan JP 7–250319 to Yazaki Corp, dated Sep. 26, 1995.
Patent Abstract of Japan JP 11–55691 to Sony Corp, dated Feb. 26, 1999.

* cited by examiner

Primary Examiner—Stephen C. Buczinski
(74) Attorney, Agent, or Firm—Christie, Parker & Hale, LLP

(57) ABSTRACT

A range-finder, capable of finding a range by image realization, having two distantly arranged imaging devices. The first pattern having a predetermined size and the first positional information is extracted by the pattern extracting section from the first image of a target which has been made by the first imaging device. In the second image of the same target, which has been made by the second imaging device, the second pattern having the second positional information, which is most correlated with the first pattern in a plurality of upward and downward horizontal or vertical lines corresponding to the first positional information, is detected by the correlation processing section. Parallax is found from the first and the second positional information by the parallax calculating section. A distance to the target is found from this parallax by using the principle of triangulation.

13 Claims, 10 Drawing Sheets

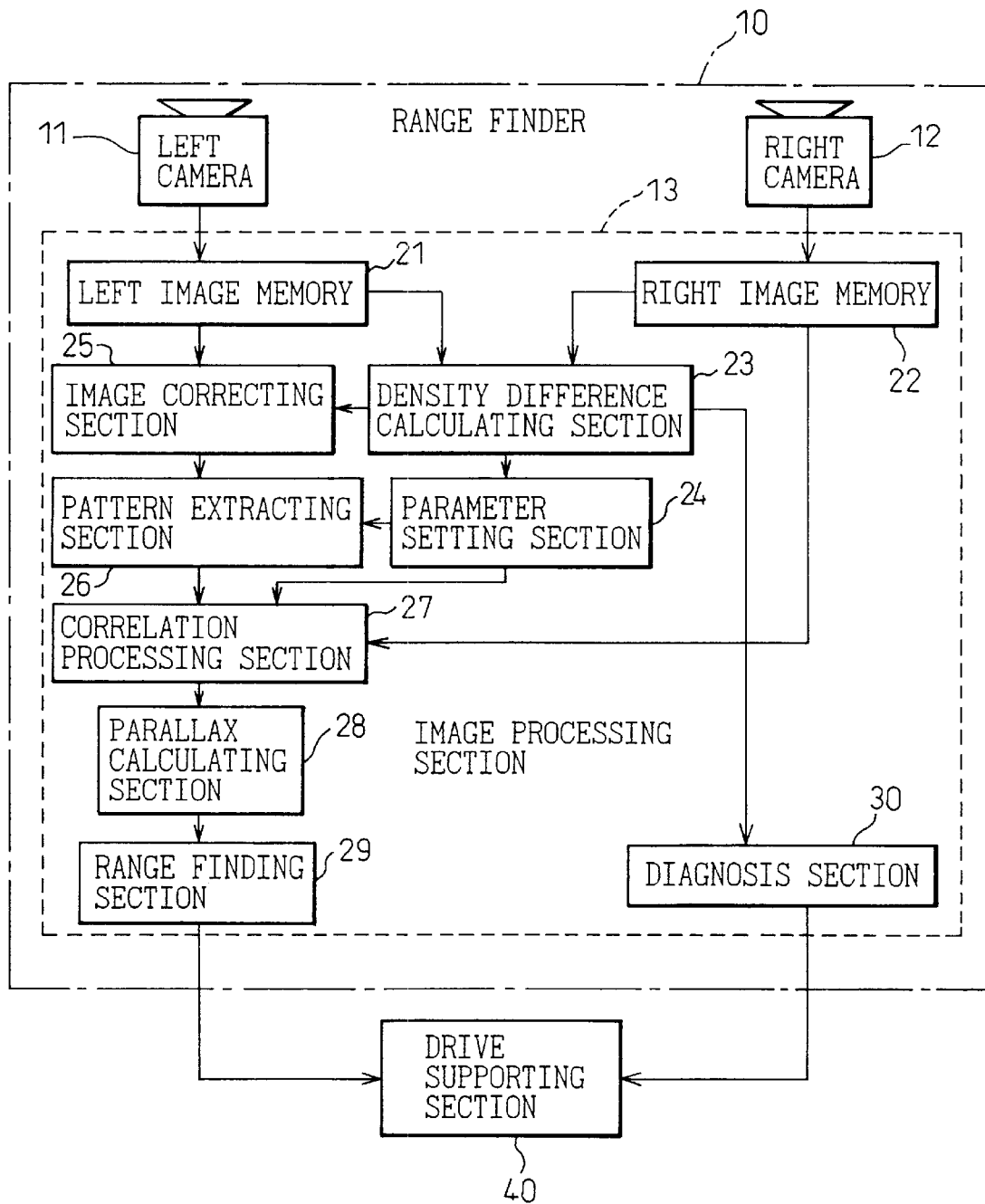

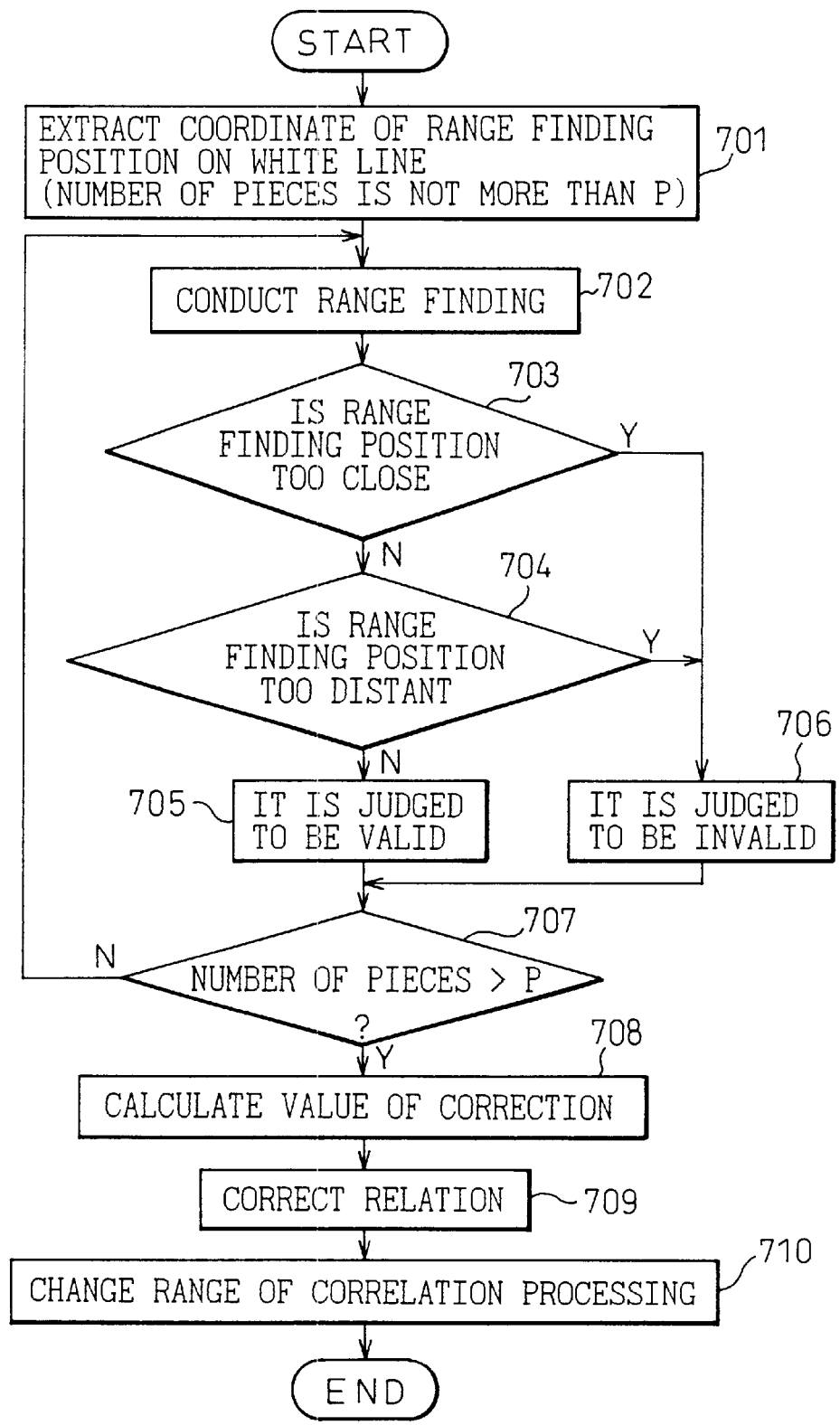

RANGE FINDER FOR FINDING RANGE BY IMAGE REALIZATION

CROSS-REFERENCE TO RELATED APPLICATION

This application claims priority of Japanese Patent Application No. 2001-186779, filed on Jun. 20, 2001.

BACKGROUND OF THE INVENTION

1. Field of the Invention

The present invention relates to a range finder used for supporting a driver when the driver drives an automobile. More particularly, the present invention relates to a range finder for finding a range to a target, which is running in front, by image realization, when a plurality of cameras or image pickup elements are used.

2. Description of the Related Art

In order to enhance the convenience and safety of driving an automobile, a driver support system has been recently put into practical use. In this driver support system, range finding to find a range to a vehicle running in front is one of the factors to be provided. A range to a vehicle running in front has been detected until now by a range finding system, in which the range is found by image realization with compound-eye cameras.

In the above conventional range finding system in which compound-eye cameras are used, a range to a vehicle running in front is found as follows. A vehicle running in front is photographed by two cameras, which are mounted at a predetermined interval on a vehicle running behind, or by image pickup elements such as image sensors. The parallax of the same object (the vehicle running in front) on the thus obtained two images is utilized, and a range to the vehicle running in front is found from this parallax by the principle of triangulation.

On the other hand, in some cases, distortion is caused on an image obtained by each camera when the optical system is distorted. When the obtained image is distorted, it impossible to accurately calculate the parallax, and range finding is erroneously conducted. In order to solve the above problems, a distorted image photographed by each camera is corrected by a distortion correcting circuit so that the distorted image can be processed to an image having no distortion, and then a range to a target is found.

However, in the above conventional range finding method, as the entire image photographed by each camera must be corrected, it becomes necessary to provide a large-scale distortion correcting circuit and a memory to be incorporated into the distortion correcting circuit. Further, since the entire image must be corrected, a quantity of processing necessary for correction is increased, which causes a drop in the processing speed. Furthermore, even if the distortion is corrected, a fluctuation is caused in the pixel values of the images photographed by the right and left cameras. Therefore, it is difficult to accurately calculate the parallax. Furthermore, the above conventional range finding is disadvantageous in that a road surface (shadows, white lines and characters on the road) becomes an object of range finding in some cases.

SUMMARY OF THE INVENTION

The present invention has been accomplished to solve the above problems of the conventional range finding method for finding a range to a target by image realization. It is an object of the present invention to provide a range finder capable of finding a range to a target at high speed without having an error in range-finding caused by distortion of an image without providing a large-scale correcting circuit and memory.

It is another object of the present invention to provide a range finder capable of accurately finding a range to a target by correcting a fluctuation caused between images photographed by a right and a left camera.

It is still another object of the present invention to provide a range finder capable of accurately finding a range to a target without having an error in range-finding caused by a road surface.

In order to solve the above problem, the present invention provides a range finder for finding a range to a target by image realization comprising: a first and a second imaging device arranged at a predetermined interval; a pattern extracting section for extracting a first pattern having a predetermined size and the first positional information from a first image of the target which has been made by the first imaging device; a correlation processing section for detecting a second pattern having the second positional information, which is most correlated with the first pattern, from a plurality of horizontal or vertical lines located at positions corresponding to the first positional information in the second image of the target which has been made by the second imaging device; and a parallax calculating section for finding parallax from the first and the second positional information. When a correlation is found by a plurality of upward and downward lines, it is possible to accurately find parallax without conducting correction with respect to the distortion and axial misalignment.

In a range finder of the present invention, the correlation processing section finds a correlation with the first pattern for every a plurality of horizontal or vertical lines, and the second pattern having the second positional information, which is most correlated with the first pattern, is detected according to the plurality of pieces of correlation which have been found. A correlation is found by a plurality of upward and downward lines, and when it is judged how far a correlating position on each line departs from a vertical line, a pattern can be accurately realized even if other confusing patterns exist.

In a range finder of the present invention, it is preferable that the first image is divided into a proximity region, which can be easily correlated, and a background region which is difficult to be correlated, and the correlation processing section finds a correlation with the first pattern for every a plurality of horizontal or vertical lines only when the first pattern exists in the background region. In this constitution, only when the pattern is realized in a background region in which it is difficult to correlate, a correlation is found by a plurality of upward and downward lines.

It is preferable that a range finder of the present invention further comprises an image correcting section for detecting a state of misalignment of the first or the second image according to the correlation of the first pattern with the second pattern for every a plurality of horizontal or vertical lines which has been found by the correlation processing section, and for correcting the first or the second image according to the state of the detected misalignment.

Further, it is preferable that a range finder of the present invention further comprises an alarm generating section for generating an alarm when a value of correlation, which is obtained in the case where the correlation processing section detects the second pattern, is compared with a correlation reference value and when the value of correlation is not more than a correlation reference value. When the distortion of an image plane and the misalignment of an axis are large and it is impossible to accurately conduct range finding, an alarm is generated.

In order to solve the above problems, a range finder for finding a range to a target by image realization of the present invention comprises: a first and a second imaging device arranged at a predetermined interval; a density difference detecting section for finding a density difference between the first image and the second image from the first image of the target, which has been made by the first imaging device, and the second image of the target which has been made by the second imaging device; an image density correcting section for correcting density of the first or the second image according to the density difference between the first and the second image; a pattern extracting section for extracting a first pattern having a predetermined size and first positional information from the first image; a correlation processing section for detecting a second pattern having the second positional information, which is most correlated with the first pattern, in the second image of the target which has been made by the second imaging device; and a parallax calculating section for finding parallax from the first and the second positional information. When a difference of density between the right and the left image is found and one of the images is corrected by utilizing the difference in density, it becomes possible to accurately conduct range finding.

In order to solve the above problems, a range finder for finding a range to a target by image realization of the present invention comprises: a first and a second imaging device arranged at a predetermined interval; a density difference detecting section for finding a density difference between the first image and the second image from the first image of the target, which has been made by the first imaging device, and the second image of the target which has been made by the second imaging device; a pattern extracting section for extracting a first pattern having a predetermined size and first positional information from a first image; an image density correcting section for correcting density of the first pattern according to the density difference between the first and the second image; a correlation processing section for detecting a second pattern having the second positional information which is most correlated with the corrected first pattern in the second image; and a parallax calculating section for finding parallax from the first and the second positional information. When a difference of density between the right and the left image is found and only the pattern is corrected by utilizing the difference of density, it becomes possible to accurately conduct range finding.

It is preferable that a range finder of the present invention further comprises a parameter setting section for setting a parameter necessary for processing conducted by the correlation processing section according to a density difference between the first and the second image. When the parameter necessary for correlation processing is changed by the difference of density found from the right and the left image, range finding can be more accurately conducted.

In order to solve the above problems, a range finder for finding a range to a target by image realization of the present invention comprises: a first and a second imaging device arranged at a predetermined interval; a pattern extracting section for extracting a first pattern having the first positional information containing a range finding target from the first image of the target which has been made by the first imaging device; a correlation processing section for detecting a second pattern having the second positional information, which is most correlated with the first pattern in the second image of the target which has been made by the second imaging device; a parallax calculating section for finding parallax from the first and the second positional information; a range finding section for finding a range to the range finding target by the parallax; a realizing section for realizing a height of the range finding target according to the position in the first or the second image of the range finding target and according to the result of range finding conducted by the range finding section; and a nullifying section for nullifying the result of range finding conducted by the range finding section in the case where the height of the range finding target is smaller than the reference height. The height of the range finding target is realized by the position in the image, the range of which was found, and by the result of range finding. When the height is not more than a predetermined height from the ground, the target of range finding is realized as characters and shadows on a road, and the result of range finding is nullified.

It is preferable that a range finder of the present invention further comprises a road surface position correcting section for detecting a white line in the first or the second image and for finding a range to a forward end portion of the white line and for correcting a road face position, which becomes a reference to realize the height of the range finding target, from the value of range finding of the forward end portion of the white line. When the position of the ground in the image is corrected by the result of realization of a white line on a road, it becomes possible to judge a height agreeing with the road environment.

A range finder of the present invention further comprises a road surface correcting section for detecting a third pattern having the same characteristic as that of the white line from the first or the second image and for finding a range to the forward end portion of the third pattern and for correcting a road face position, which becomes a reference to realize the height of the range finding target, from the value of range finding of the forward end portion of the third pattern. Another pattern such as a character on a road surface having the same characteristic as that of a white line on the road surface is extracted from an image, and its forward end portion is used as a reference and the position of the ground in the image is corrected. Due to the foregoing, it becomes possible to judge a height agreeing with the road environment.

In a range finder of the present invention, it is preferable that the reference value correcting section corrects a reference value according to a plurality of range finding values of the forward end portion of the third pattern. The reference value is corrected according to data sent from a plurality of positions.

Further, in a range finder of the present invention, it is preferable that the reference value correcting section corrects the road surface position by utilizing only a range finding value in a predetermined range of values in the plurality of range finding values of the forward end portion of the third pattern. Without using data outside the predetermined range of values, the reference value is more accurately corrected.

In order to solve the above problems, a range finder for finding a range to a target by image realization of the present invention comprises: a first and a second imaging device arranged at a predetermined interval; a pattern extracting section for extracting a first pattern having a predetermined size and the first positional information containing the range finding target from the first image of the target which has been made by the first imaging device; a correlation processing section for detecting a second pattern having the second positional information, which is most correlated with the first pattern in the second image of the target which has been made by the second imaging device; a parallax calculating section for finding parallax from the first and the second positional information; a range finding section for finding a range to the range finding target by the parallax; a judging section for judging whether or not the range finding target exists in a range finding objective region according to the result of range finding to find a range to the target and also according to the position of the range finding target in the first or the second image; and a nullifying section for nullifying the result of range finding conducted by the range finding section in the case where the range finding target exists outside the range finding objective region. When range finding is conducted only in a predetermined range, the processing time of range finding can be reduced.

A range finder further comprises a height realizing section for realizing a height of the range finding target according to the position of the range finding target in the first or the second image, wherein the nullifying section does not nullify the result of range finding conducted by the range finding section in the case where the height is larger than a predetermined reference value of the height even if the range finding target exists outside the objective region of range finding. In the case where the height is a predetermined value although it is outside the range finding objective region, it becomes possible to more accurately realize a range finding target when it is made to be a range finding object.

BRIEF DESCRIPTION OF THE DRAWINGS

The present invention will be more clearly understood from the description as set forth below with reference to the accompanying drawings, wherein

FIG. 2A is a block diagram showing an outline of the constitution of a range finder of an embodiment of the present invention;

FIG. 7 is a flow chart for explaining a correction procedure of a relation showing a road surface position.

DESCRIPTION OF THE PREFERRED EMBODIMENTS

Figure 1A:
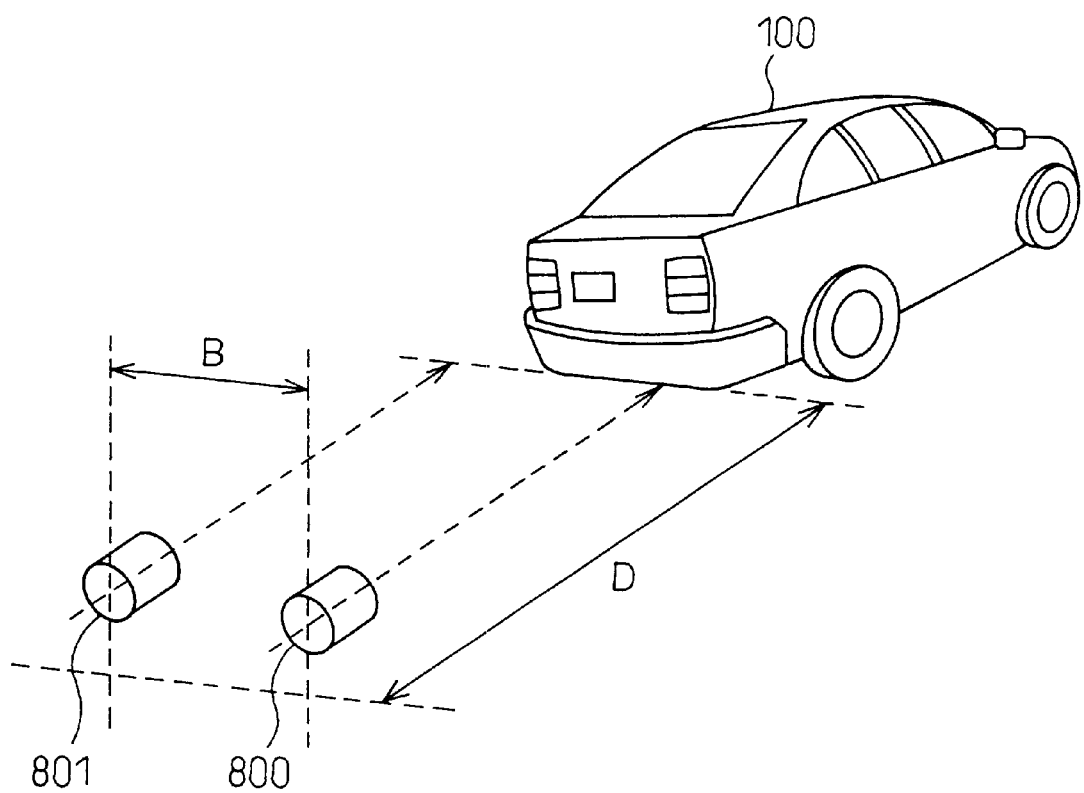
FIG. 1A is a view for explaining the principle of a conventional range finding system in which compound-eye cameras are used.

Before describing the preferred embodiments, an explanation will be given to the conventional range finder for finding a range by image realization shown in FIGS. 1A to 1C.

In the conventional range finding system for finding a range by image realization, range finding is conducted by using compound eye cameras. Referring to FIG. 1A, explanations will be made into a case in which a distance from a vehicle, which is running behind, to a vehicle 100, which is running in front, is found by the conventional range finding system using compound eye cameras. As shown in FIG. 1A, the left camera 801 and the right camera 800 are horizontally arranged in the vehicle, which is running behind, at a predetermined interval (=base line length) B. The optical axis of the left camera 801 and that of the right camera 800 are horizontally arranged. In this case, the same object in the image photographed by the left camera 801 and that in the image photographed by the right camera 800 are shifted from each other in horizontally. This misalignment between the position of the image photographed by the left camera 801 and that of the image photographed by the right camera 800 is referred to as parallax. The distance from the vehicle which is running behind to the vehicle which is running in front, can be found by the principle of triangulation in which this parallax is utilized.

Figure 1B:
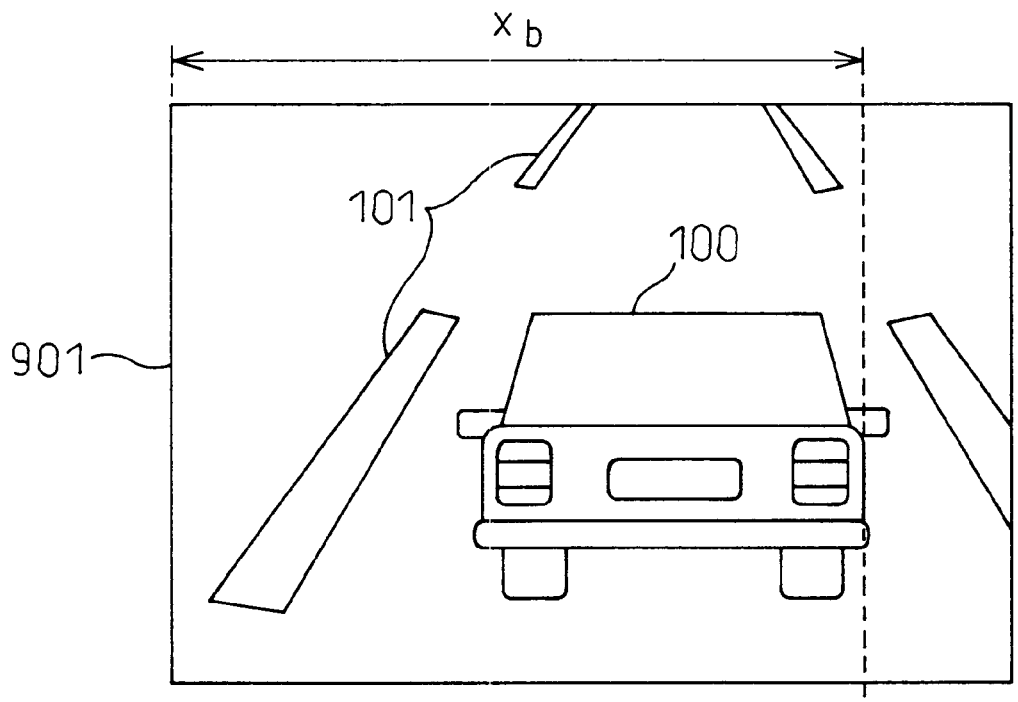
FIG. 1B is a view showing images photographed by a right and a left camera shown in FIG. 1A for explaining the principle of parallax range finding.
Figure 1B:
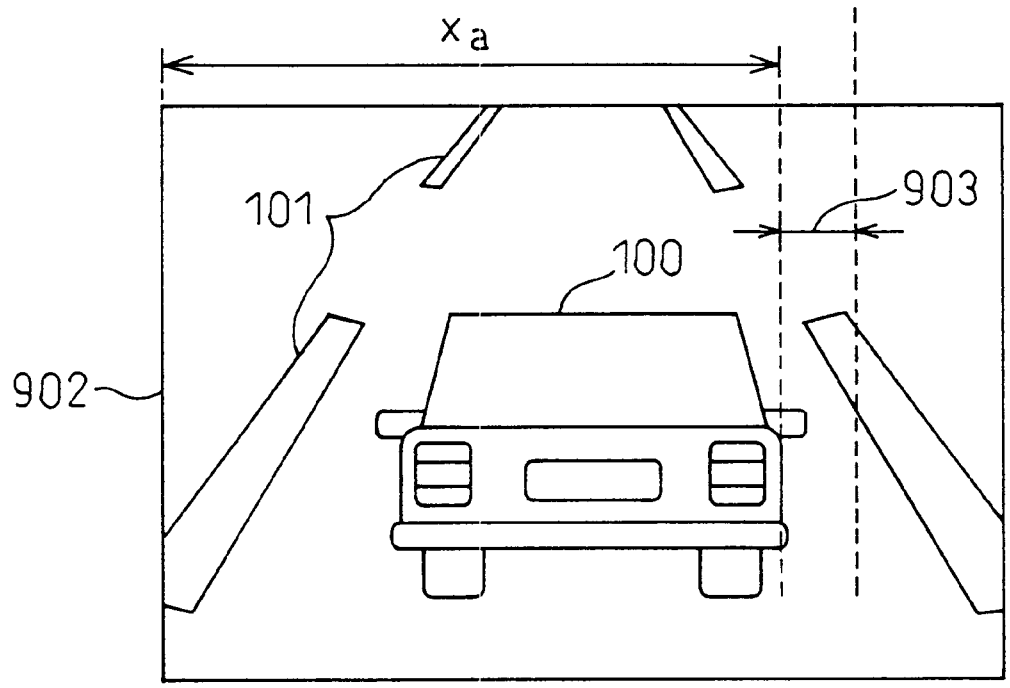
Figure 1C:
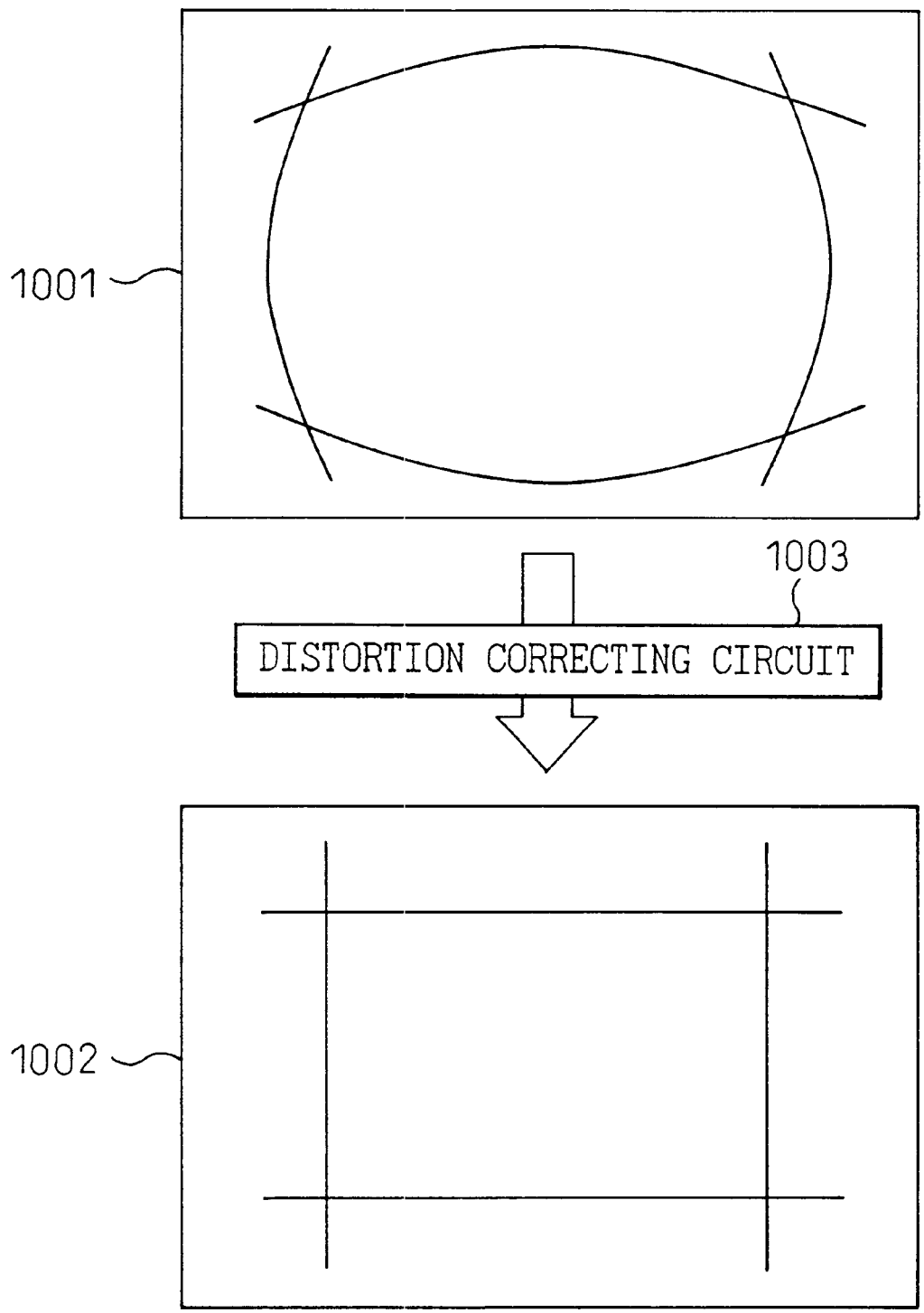
FIG. 1C is a view showing an image containing distortion made by a camera and also showing an image obtained when the image distortion has been corrected by a distortion correcting circuit.

The image 901 shown in FIG. 1B is an example of the image photographed by the left camera, and the image 902 shown in FIG. 1B is an example of the image photographed by the right camera. Distance D (m) to a vehicle running in front can be found by the following expression.

$$D = f \cdot B / \{F(xb - xa)\}$$

In this connection, (xb−xa) expresses parallax 903. In the above expression, the left end of each image photographed by each camera is used as a reference, the lateral coordinate to a reference position of the image 901 photographed by the left camera is xb, the lateral coordinate to a reference position of the image 902 photographed by the right camera is xa, the focal distance of each camera is f, the pixel pitch in each image is F, and the length of a base line is B.

In some cases, there is a possibility that distortion is caused in the image photographed by each camera due to distortion in the optical system. Distortion is high especially when a wide angle lens is used for the camera. When distortion is caused in an image, it becomes impossible to accurately calculate parallax, which causes an error in range finding. In order to solve the above problems, as shown in FIG. 1C, the entire image 1001 photographed by each camera containing distortion is processed into the image 1002 having no distortion by the distortion correcting circuit 1003, and then the aforementioned parallax (parallax 903 shown in FIG. 1B) is calculated.

However, the above conventional method of range finding has the following disadvantages. According to the above conventional method of range finding, as the entire image photographed by each camera must be corrected, it is necessary to provide a large-scale distortion correcting circuit and a memory used for the distortion correcting circuit. Since the entire image must be corrected, a quantity of processing of image data is increased, which causes a drop of the processing speed. Further, even if the distortion is corrected, fluctuation is caused in the pixel values of the images photographed by the right and the left camera. Accordingly, it is difficult to accurately calculate parallax. Furthermore, when range finding is conducted, a road face, on which shadows, white lines and characters exist, becomes an object of range finding.

FIG. 2A is a block diagram showing an outline of the constitution of an embodiment of the range finder 10 of the present invention. The range finder 10, which is mounted on a vehicle, includes a left camera 11, right camera 12 and image processing section 13. Various signals are inputted from the range finder 10 into the driver support device 40 mounted on the vehicle. According to the signals sent from the range finder 10, the driver support device 40 realizes a target such as a vehicle, which is running in front, and an object existing ahead. According to the realization of the target and others, the driver support device 40 helps evade a danger and warns a driver.

The image processing section 13 includes: a left image memory 21, right image memory 22, density difference detecting section 23, parameter setting section 24, image correcting section 25, pattern extracting section 26, correlation processing section 27, parallax calculating section 28, range finding section 29 and diagnosis section 30.

The left camera 11 and the right camera 12 are respectively arranged at positions in a vehicle (referred to as a self-vehicle hereinafter) on which the range finder 10 is mounted and at the same height from the ground and at a predetermined interval so that parallax can be generated in the visual field of each camera with respect to an object in the field of view. The left camera 11 takes a photograph of space in the field of view of the left camera 11. Data of the left image photographed by the left camera 11 are stored in the left image memory 21. In the same manner, the right camera 12 takes a photograph of space in the field of view of the right camera 12. Data of the right image photographed by the right camera 12 are stored in the right image memory 22.

Figure 3A:
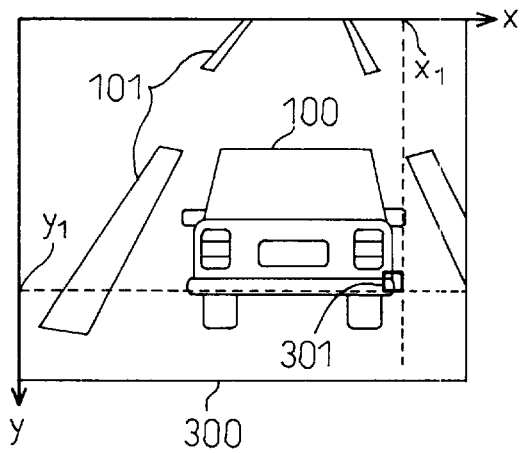
FIG. 3A is a view showing a left input image photographed by a left camera and also showing a first pattern in the image.
Figure 3B:
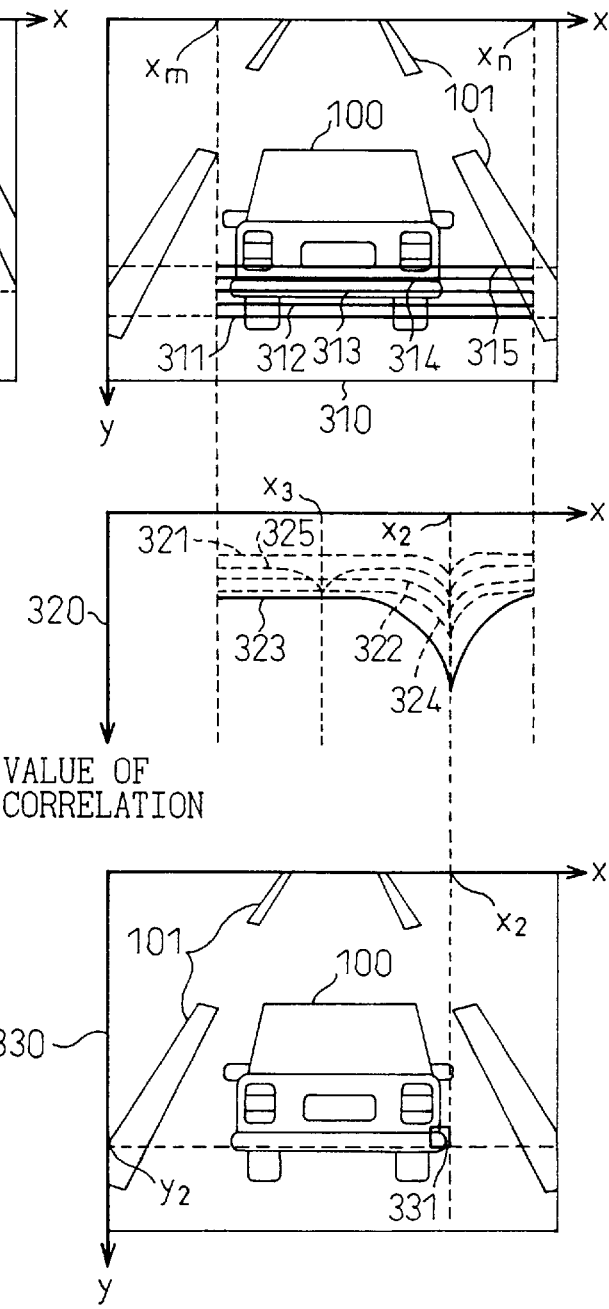
FIG. 3B is a view showing a right input image photographed by a right camera, a graph of correlated values and a second pattern which is most correlated with the first pattern in FIG. 3A extracted by the correlation processing.

The left image 300 shown in FIG. 3A is an example of the left image photographed by the left camera 11, and the right image 310 shown in FIG. 3B is an example of the right image photographed by the right camera 12. In the left image 300 and the right image 310, reference numeral 100 is a vehicle running in front, and reference numeral 101 is a white line on a road. In this embodiment, each image is composed of 640 pixels existing in the direction of the x-axis and 480 pixels existing in the directions of the y-axis in the drawing. Each pixel has density of 256 gradations.

The density difference calculating section 23 calculates average image density of the inputted right and left images. Further, the density difference calculating section 23 calculates a difference in density between the right and the left image. The thus calculated density difference data are sent to the image correcting section 25 and the diagnosis section 30.

The image correcting section 25 receives density difference data from the density difference calculating section 23 and corrects density of the entire left image according to the density difference data. That is, if a density difference is caused between the images inputted from the right and left cameras, it becomes impossible to accurately conduct the pattern matching which will be described later. Accordingly, there is a possibility that parallax cannot be accurately calculated and, further, range finding cannot be accurately conducted. For the above reasons, a density balance between the right and left images is corrected. In this connection, density of the entire left image may not be corrected, and density may be corrected only in a specific region in the image which has been previously determined or detected.

In the case where a density difference received by the diagnosis section 30 is higher than a predetermined value, the diagnosis section 30 judges that one of the right and left cameras or both of the right and left cameras are defective. Then, the diagnosis section 30 sends an alarm signal to the driver support device 40.

The pattern extracting section 26 extracts the first pattern 301 having the coordinate data (x1, y1)) from the left image 300. It is preferable that the first pattern 301 is composed of 3×3 pixels or 4×4 pixels. It is preferable that the first pattern 301 is extracted from an edge section of the range finding target (the vehicle 100 in the case of the left image 300) by means of edge detection.

The correlation processing section 27 detects the second pattern, which is most correlated with the first pattern 301 in the left image 300 extracted by the pattern extracting section 26, from the right pattern 310 by means of pattern matching, so that the coordinate data of the second pattern can be detected. Pattern matching of the first pattern 301 with the right image 310 is conducted on the five upward and downward lines (the lines 311 to 315 in FIG. 3B) round the y-coordinate (y1) of the first pattern 301, that is, pattern matching of the first pattern 301 with the right image 310 is conducted among the five pixels in the direction of the y-axis. It is preferable that pattern matching is conducted among the five upward and downward lines. However, it is possible to adopt the other numbers of lines if necessary. Further, a range on the x-axis on which pattern matching is conducted can be previously set in the range from xm to xn round the x-coordinate (x1) of the first pattern 301. In this connection, in this embodiment, pattern matching is conducted on a plurality of upward and downward lines in the direction of the y-axis, however, pattern matching may be conducted on a plurality of upward and downward lines in the direction of the x-axis.

According to the conventional method, after distortion of the right and left images or misalignment of the axis has been corrected, pattern matching is conducted. However, in this embodiment, such a correction is not conducted but pattern matching is conducted on a plurality of upward and downward lines in the direction of the y-axis or the x-axis. According to this embodiment, as described above, even if a correction of distortion is not conducted on the inputted right and left images, it becomes possible to accurately find parallax when a plurality of lines, which are located upward and downward, are correlated. Accordingly, it becomes unnecessary to provide a large-scale correcting circuit and memory for correcting distortion on the entire image plane. Further, the second pattern can be detected without requiring the processing time for correcting distortion on the entire image plane.

Pattern matching is conducted as follows. First, on each line on the y-axis, a window of the same size as that of the first pattern 301 is set for each pixel on the x-axis, and a value of correlation of each window with the first pattern 301 is calculated. Further, the value of correlation of each window is plotted on a graph, and a window, the value of correlation of which is highest, is realized as the second pattern which is most correlated with the first pattern 301. In this connection, a value of correlation is found by calculation in which a well known cross correlation function is used. As an example of the well known cross correlation function, there is provided a method of SSDA (Sequential Similarity Detecting Algorithm) in which $\int\int |f-t|\, dxdy$ is used as a scale of matching.

FIG. 3B is a graph 320 showing values of correlation. Graphs 321 to 325 shown in the graph 320 of values of correlation respectively correspond to the lines 311 to 315 of the right image 310. According to the right image 320, it can be judged that the highest correlation can be obtained at the coordinate x2 on the x-axis in the graph 323. Accordingly, it can be judged that the second pattern, which is most correlated with the first pattern 301 in the right image 310, is a pattern indicated by the reference numeral 331 in the right image 330 after the completion of processing of correlation, and the coordinate is (x2, y2)). In this connection, in the graph 320 of the values of correlation, all graphs have a peak value at the coordinate x2. Therefore, even if the graph 325 has a peak value at the coordinate x3, the coordinate except for x2 can be excluded. That is, it is possible to prevent the occurrence of an error of range finding in a state of a plurality of graphs (a state of distribution of values of correlation).

In this connection, the parameter setting section 24 can conduct processing of correlation in the correlation processing section 27 and setting of various parameters relating to the pattern extracting section 26 according to a density difference between the right and the left image calculated by the density difference calculating section 23. For example, it is preferable that a threshold value for extracting an edge used in the pattern extracting section 26 and a threshold value for judging a correlation coincidence used in the correlation processing section 27 are set according to the density difference. In this connection, since a value of correlation becomes low when the density difference is small, when the threshold value of the value of correlation is lowered according to the density difference, it becomes possible to accurately judge a coincidence of correlation.

The parallax calculating section 28 finds parallax of the range finding target (vehicle) 100 from the coordinate (x1, y1)) of the first pattern 301 in the left image 300 shown in FIG. 3A and the coordinate (x2, y2)) of the second pattern 331 in the right image 330 shown in FIG. 3B. In this case, parallax can be expressed by the following expression.

$$\text{Parallax} = ((x2-x1)^2 + (y2-y1)^2)^{1/2}$$

The range finding section 29 finds a range between the range finding target 100 and the self-vehicle according to parallax calculated by the parallax calculating section 28 and sends the thus obtained range data to the driver support device 40. In this way, data of the distance to the range finding target can be sent to the driver support device 40. In the above example, data of range finding are found in one portion in the image, however, data of range finding may be simultaneously found for a plurality of portions in the image. Alternatively, data of range finding may be found in a plurality of portions of the range finding target and an average value may be found from a plurality of data, so that the average value can be used as data of range finding of the range finding target 100.

In FIG. 2A, the left image memory 21 and the right image memory 22 can be respectively realized by the frame memories. The density difference calculating section 23, parameter setting section 24, image correcting section 25, pattern extracting section 26, correlation processing section 27, parallax calculating section 28, range finding section 29 and diagnosis section 30 may be respectively realized by a different processing circuit. Alternatively, they may be realized when programs for conducting calculation of the processing sections are successively executed in a computer having a CPU and various memories.

In the range finder 10 shown in FIG. 2A, for example, sampling is conducted once in several seconds on the y-coordinate of the second pattern 331, which is most correlated in the right image 330 in FIG. 3B, so that the misalignment of y-coordinate can be detected. Positions of the five upward and downward lines, on which correlation proceeding is conducted, may be corrected by utilizing the thus detected misalignment. The misalignment of the axes of the right and left images can be corrected by this correction.

Figure 2B:
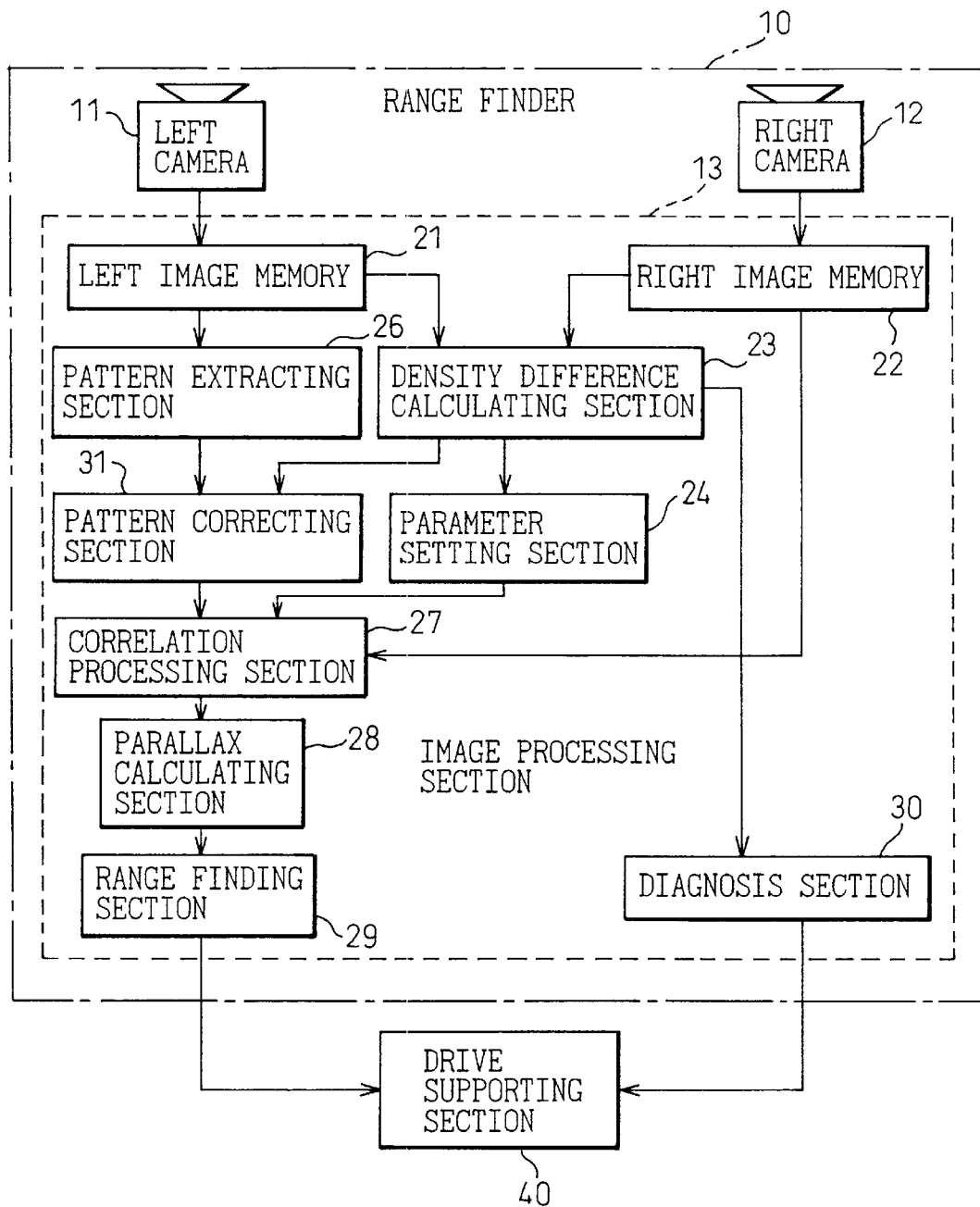
FIG. 2B is a block diagram showing an outline of the constitution of a range finder of another embodiment of the present invention.

FIG. 2B is a block diagram showing an outline of another range finder 10 of the present invention. Like reference characters are used to indicate like parts in FIGS. 2A and 2B. Different points of the range finder shown in FIG. 2B from that shown in FIG. 2A are described as follows. In the range finder shown in FIG. 2B, after the first pattern 301 has been extracted from the input image, which was photographed by the left camera 11, by the pattern extracting section 26, only the thus extracted first pattern 301 is corrected in the pattern correcting section 31 by using the density difference data calculated by the density difference calculating section 23. In the range finder shown in FIG. 2B, the entire image or the image in a specific region is not corrected like the range finder shown in FIG. 2A, and the density of only the extracted pattern is corrected. Therefore, the processing time can be shortened. The other points of operation of the range finder shown in FIG. 2B are the same as those of the range finder 10 shown in FIG. 2A. Therefore, further detailed explanations will be omitted here.

Figure 4:
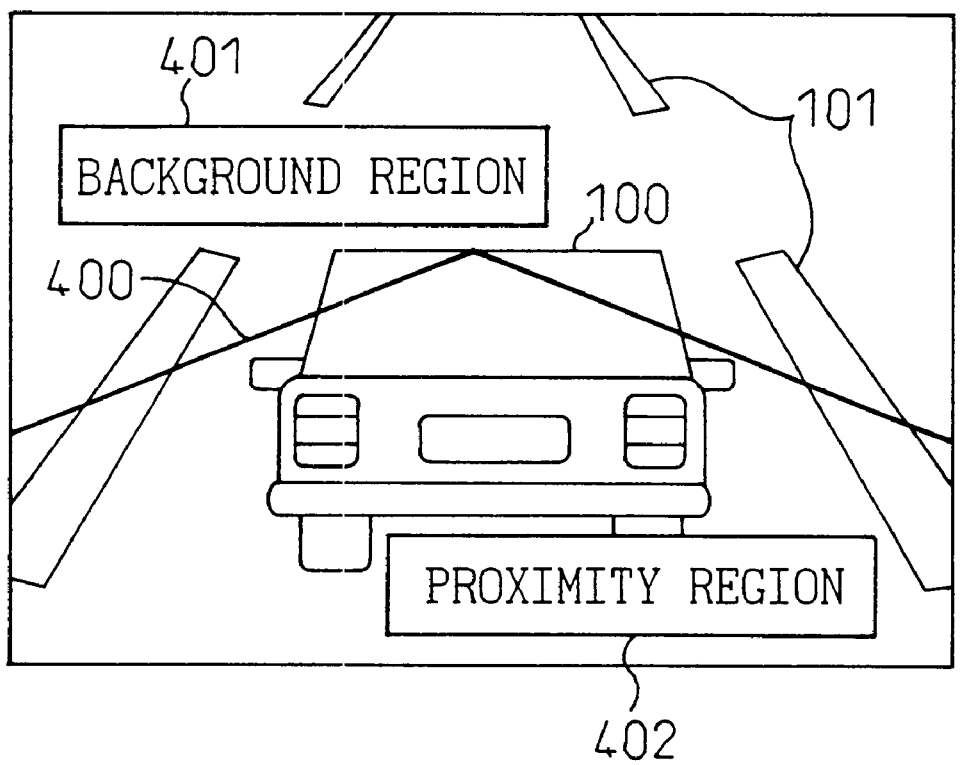
FIG. 4 is a view for explaining the classification of an input image into a background region and proximity region.

Next, referring to FIG. 4, operation of the correlation processing section 27 will be explained below. As shown in FIG. 4, the correlation processing section 27 divides an inputted image into two regions of the background region 401 and the proximity region 402 by the boundary line 400, and the range finding method is changed for each region. Only when the first pattern extracted by the pattern extracting section 26 exists in the background region 401, correlation processing is conducted on the five upward and downward lines. When the first pattern extracted by the pattern extracting section 26 exists in the proximity region 402, another simple correlation processing is conducted. The reason is that, in general, correlation processing can be easily conducted in the proximity region 402, however, correlation processing cannot be easily conducted in the background region 401. In this connection, a position of the boundary line 400 is appropriately determined according to the system. Concerning the simple correlation processing, it is possible to consider to conduct pattern matching on the same coordinate as the y-coordinate of the first pattern.

Figure 5:
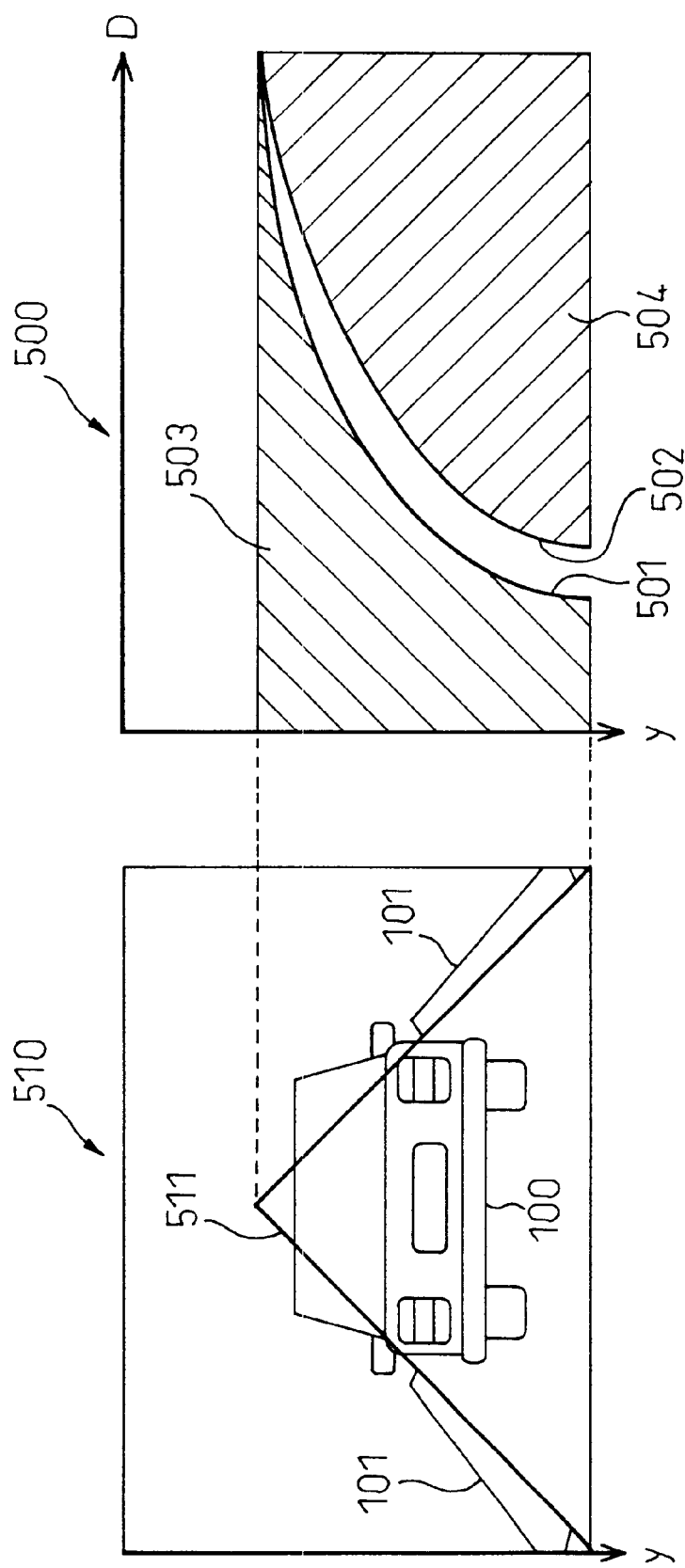
FIG. 5 is a view showing an actual input image and a relation in which a road surface position of the input image is shown, wherein the actual input image and the relation are shown standing side by side.

Next, a procedure of realizing the height of the range finding target 100 will be explained below referring to FIG. 5. Reference numeral 500 shown in FIG. 5 is a graph showing a relation between the y-coordinate in the inputted image and distance D from the right 12 and the left camera 11. In this case, a curve shown by reference numeral 502 is a relation showing a road surface position of the inputted image, and a curve shown by reference numeral 501 is a relation showing a predetermined height (reference value, for example 20 cm) from the road face. In the input image 510 shown in FIG. 5, the line 511 shows a road surface position corresponding to the relation 501. Then, in the graph 500 shown in FIG. 5, the region 503 corresponds to an object, the height of which is not less than the reference value of height from the road surface position.

Accordingly, when the graph 500 shown in FIG. 5 is utilized, it is possible to judge whether or not the height of the range finding target is not less than the reference value of height by the position (y-coordinate) in the inputted image of the range finding target and by the result of range finding (D). The realization of height of the range finding target may be conducted by the height realizing means independently provided in the image processing section 13 or by the range finding section 29.

Only when the height of the range finding target is not less than the reference value of height (in the case corresponding to the region 503), the result is made valid. When the range finding target corresponds to the other regions, it is judged that it is not a range finding target such as a road face, white line, road face character or object, and the result of range finding is made invalid. The above invalid processing of the result of range finding may be conducted by the height invalid means independently arranged in the image processing section 13. Alternatively, the above invalid processing of the result of range finding may be conducted by the range finding section 29.

Figure 6:
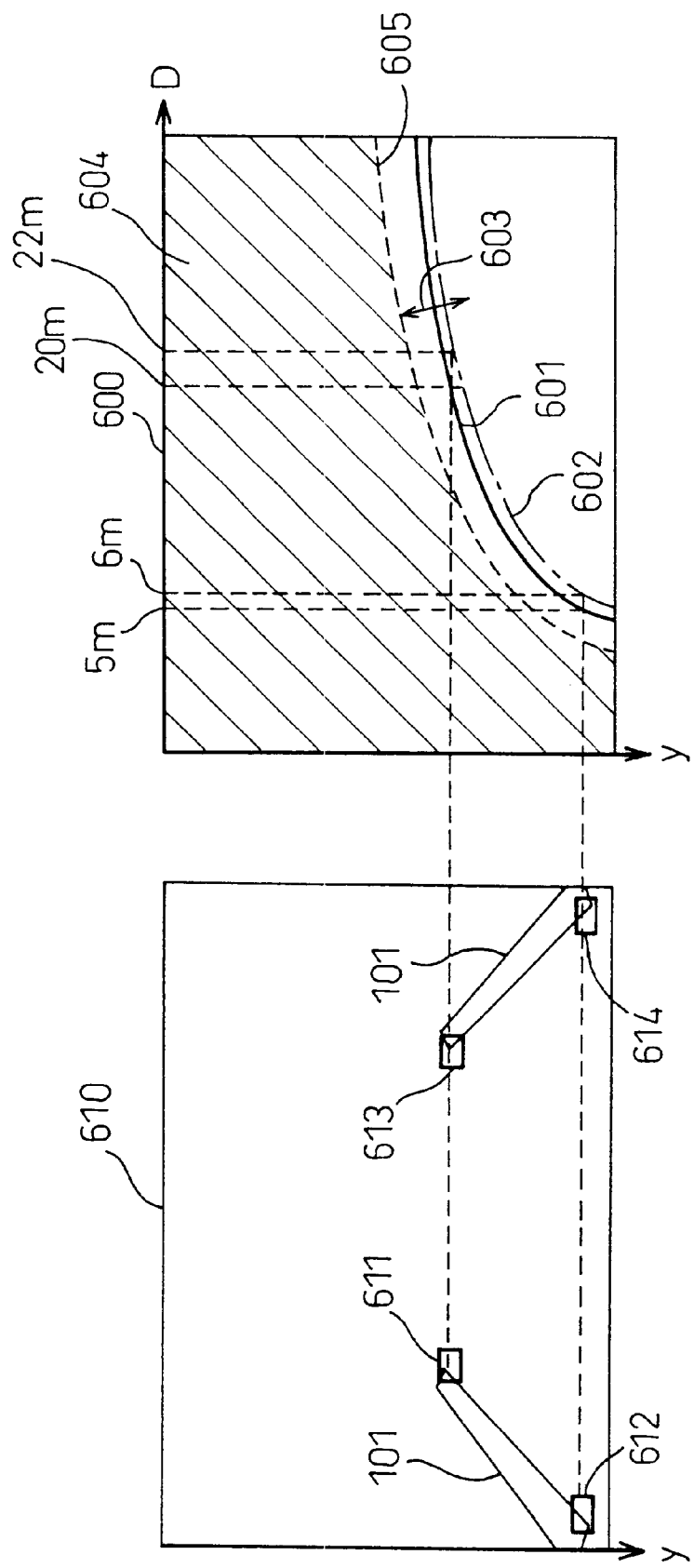
FIG. 6 is a view for explaining a correction of a relation showing a road surface position, wherein four correcting positions in an input image and a relation showing a road surface position of the input image after correction are shown standing side by side.

Next, referring to FIGS. 6 and 7, correction of a relation showing a road surface position will be explained below. In the same manner as that of the graph 500 shown in FIG. 5, the graph 600 shown in FIG. 6 shows a position (y-coordinate) in the inputted image and shows distance D from the left 11 and the right camera 12. A curve shown by reference numerals 601 is a relation showing a previously set road surface position. However, the road surface position variously changes according to the vibration of a vehicle and the environmental condition of the road. Therefore, it is preferable that the relation showing the road surface position is corrected by the inputted image.

Referring to FIG. 7, a procedure of correcting the relation showing the road surface position will be explained as follows. In the step 701, first, a position of the white line (the white line 101 of the image 610 in FIG. 6) on the road face is realized from the input image, and the coordinate is extracted. At this time, the range finding portion P is simultaneously designated. For example, it is preferable that P=4 portions.

Next, in step 702, range finding is conducted in one portion (for example, a portion shown by reference numeral 611 in the image 610) of the forward end portion of the realized white line. Next, in step 703, it is judged whether or not a position of the range finding result is too close to a previously set range. In the case where the position of the range finding result is not too close to the previously set range, in step 704, it is judged whether or not the position of the range finding result is too distant from the previously set range. In the case where the position of the range finding result in step 704 is not too distant from the previously set range, the program proceeds to step 705, and it is judged that the range finding result is valid. On the other hand, in the case where it is judged that the position of the range finding result is excessively close to the previously set range in step 703, and in the case where it is judged that the position of the range finding result is excessively distant from the previously set range in step 704, it is judged in step 706 that the result of range finding is invalid. Therefore, the result of range finding is not used for correction.

In the next step 707, it is judged whether or not the number of portions, which have been judged to be valid, is larger than P which has been set in step 701. When the number of portions, which have been judged to be valid, is not more than P which has been set in step 701, the procedures in steps 702 to 706 are repeated again. For example, in the image 610 shown in FIG. 6, range finding is conducted in four portions of the points 611 to 614.

On the other hand, in the case where it is judged in step 707 that the number of portions, which have been judged to be valid, is larger than P, the program proceeds to step 708. By utilizing the results of range finding conducted at the range finding portions, the number of which is larger than P, a correction value for correcting the relation 601 showing a road surface position is calculated. In the successive step 709, the relation 601 showing the road surface position is corrected. By utilizing the results of range finding conducted in a plurality of portions, it becomes possible to correct the relation 601 to the relation 602 more accurately showing the road surface position. Specifically, it is preferable that the correction is conducted as follows. An average of the ratios (B/A) of the distance (A) before correction at four points of 611 to 614, at which range finding has been conducted, to the range finding value (B) obtained by range finding is found, and the relation 601 showing the road surface position is corrected to the relation 602 showing a new road surface position by the average.

For example, concerning the distance (A) at four points before correction, the graph 600 shown in FIG. 6 is found by the y-coordinate of each point and the relation 601, and the distance (A) is 20 m at the point 611, the distance (A) is 5 m at the point 612, the distance (A) is 20 m at the point 613 and the distance (A) is 5 m at the point 614. Concerning the range finding values (B) at four points, when the range finding value (B) is 22 m at the point 611, the range finding value (B) is 6 m at the point 612, the range finding value (B) is 22 m at the point 613 and the range finding value (B) is 6 m at the point 614, an average of the ratios (B/A) is 1.125 m. Therefore, it is possible to find a new relation 602 in which the correction is conducted for 1.125 m.

Since the relation 602 showing a road surface position has been corrected, the relation 605 showing a position higher than the reference value of height from the road surface position is corrected according to the correction of the relation 602, and the range 604 in which correlation processing is conducted is changed in step 710. In this way, a series of procedure can be completed.

The above procedure shown in FIG. 7 may be conducted by a road surface correcting means independently provided in the image processing section 13. Alternatively, the above procedure shown in FIG. 7 may be conducted by the range finding section 29. In the above example, the road surface position is corrected by using a white line on a road surface. Alternatively, it is possible to correct the relation showing the road face position by utilizing a pattern on the inputted image plane, the color of which is white and the length in the direction of the y-axis of which is somewhat large. An example of the aforementioned pattern is characters drawn on the road face.

It is preferable that the correction range of the relation showing a road surface position is in a predetermined range (a range of the graph 603 in the graph 600 shown in FIG. 6, for example, in a range of ratios (B/A) 0.8 to 1.2).

When the range 604, in which correlation is conducted, changed in step 710 is utilized and correlation processing is conducted only on the range finding target corresponding to the range, a period of time in which correlation processing is conducted can be reduced. Therefore, the range finding time can be greatly reduced and the occurrence of an error in range finding can be prevented.

As described above, according to the present invention, it is unnecessary to provide a large-scale correction circuit and memory for conducting distortion correction of an inputted image. Accordingly, the size and cost of the range finder can be reduced.

According to the present invention, it is possible to accurately conduct range finding of a target without conducting distortion correction on an inputted image.

Further, when a road surface position is corrected according to the present invention, it becomes unnecessary to conduct range finding on an unnecessary target. Therefore, range finding can be accurately conducted at high speed.

What is claimed is:

1. A range finder for finding a range to a target by image realization comprising:

a first and a second imaging device arranged at a predetermined interval;

a pattern extracting section for extracting a first pattern having a predetermined size and first positional information from a first image of the target which has been made by the first imaging device, wherein the first image is divided into a proximity region, which can be easily correlated, and a background region which is difficult to be correlated;

a correlation processing section for detecting a second pattern having second positional information, which is most correlated with the first pattern, from a plurality of horizontal or vertical lines located at positions corresponding to the first positional information in the second imaging device wherein the second pattern having the second positional information, which is most correlated with the first pattern, is detected according to the plurality of pieces of correlation which have been found and wherein the correlation processing section finds a correlation with the first pattern for the plurality of horizontal or vertical lines only when the first pattern exists in the background region; and a parallax calculating section for finding parallax from the first and the second positional information.

2. A range finder according to claim 1, further comprising:

an image correcting section for detecting a state of a misalignment of the first or the second image according to the correlation of the first pattern with the second pattern for a plurality of horizontal or vertical lines which has been found by the correlation processing section, and for correcting the first or the second image according to the state of detected misalignment.

3. A range finder according to claim 1, further comprising:

an alarm generating section for generating an alarm when a value of correlation, which is obtained in the case where the correlation processing section detects the second pattern, is compared with a correlation reference value and when the value of correlation is not more than a correlation reference value.

4. A range finder for finding a range to a target by image realization comprising:

a first and a second imaging device arranged at a predetermined interval;

a density difference detecting section for finding a density difference between a first image of the target made by the first imaging device and a second image of the target made by the second imaging device;

an image density correcting section for correcting density of the first or the second image according to the density difference between the first and the second images;

a pattern extracting section for extracting a first pattern having a predetermined size and first positional information from the first image;

a correlation processing section for detecting a second pattern having second positional information, which is most correlated with the first pattern, in the second image of the target; and a parallax calculating section for finding parallax from the first and the second positional information.

5. A range finder according to claim 4, further comprising: a parameter setting section for setting a parameter necessary for processing conducted by the correlation processing section according to a density difference between the first and the second image.

6. A range finder for finding a range to a target by image realization comprising:

a first and a second imaging device arranged at a predetermined interval;

a density difference detecting section for finding a density difference between a fist image of the target made by the first imaging device and a second image of the target made by the second imaging device;

a pattern extracting section for extracting a first pattern having a predetermined size and first positional information from the first image;

an image density correcting section for correcting density of the first pattern according to a density difference between the first and the second images;

a correlation processing section for detecting a second pattern having second positional information which is most correlated with the corrected first pattern in the second image; and a parallax calculating section for finding parallax from the first and the second positional information.

7. A range finder for finding a range to a target by image realization comprising:

a first and a second imaging device arranged at a predetermined interval;

a pattern extracting section for extracting a first pattern having first positional information containing a range finding target from a first image of the target which has been made by the first imaging device;

a correlation processing section for detecting a second pattern having second positional information, which is most correlated with the first pattern in a second image of the target which has been made by the second imaging device;

a parallax calculating section for finding parallax from the first and the second positional information;

a range finding section for finding a range to the range finding target by the parallax;

a realizing section for realizing a height of the range finding target according to the position in the first or the second image of the range finding target and according to result of range finding conducted by the range finding section; and a nullifying section for nullifying the result of range finding conducted by the range finding section in the case where the height of the range finding target is smaller than the reference height.

8. A range finder according to claim 7, further comprising: a road surface position correcting section for detecting a white line in the first or the second image and for finding a range to a forward end portion of the white line and for correcting a road face position, which becomes a reference to realize the height of the range finding target, from the value of range finding of the forward end portion of the white line.

9. A range finder according to claim 7, further comprising: a road surface correcting section for detecting a third pattern having same characteristic as that of a white line from the first or the second image and for finding a range to a forward end portion of the third pattern and for correcting a road face position, which becomes a reference to realize the height of the range finding target, from the value of range finding of the forward end portion of the third pattern.

10. A range finder according to claim 9, wherein the reference value correcting section corrects the reference value according to a plurality of range finding values of the forward end portion of the third pattern.

11. A range finder according to claim 10, wherein the reference value correcting section corrects the road surface position by utilizing only a range finding value in a predetermined range of values in the plurality of range finding values of the forward end portion of the third pattern.

12. A range finder for finding a range to a target by image realization comprising:

a first and a second imaging device arranged at a predetermined interval;

a pattern extracting section for extracting a first pattern having a predetermined size and first positional information containing the range finding target from a first image of the target which has been made by the first imaging device;

a correlation processing section for detecting a second pattern having second positional information, which is most correlated with the first pattern, in a second image of the target which has been made by the second imaging device;

a parallax calculating section for finding parallax from the first and the second positional information;

a range finding section for finding a range to the range finding target by the parallax;

a judging section for judging whether or not the range finding target exists in a range finding objective region according to the result of range finding to find a range to the target and also according to the position of the range finding target in the first or the second image; and a nullifying section for nullifying the result of range finding conducted by the range finding section when the range finding target exists outside the range finding objective region.

13. A range finder according to claim 12, further comprising: a height realizing section for realizing a height of the range finding target, wherein the nullifying (section does not nullify the result of range finding conducted by the range finding section when the height is larger than a predetermined reference value of the height even if the range finding target exists outside the objective region of range finding.

* * * * *